Figure 1:
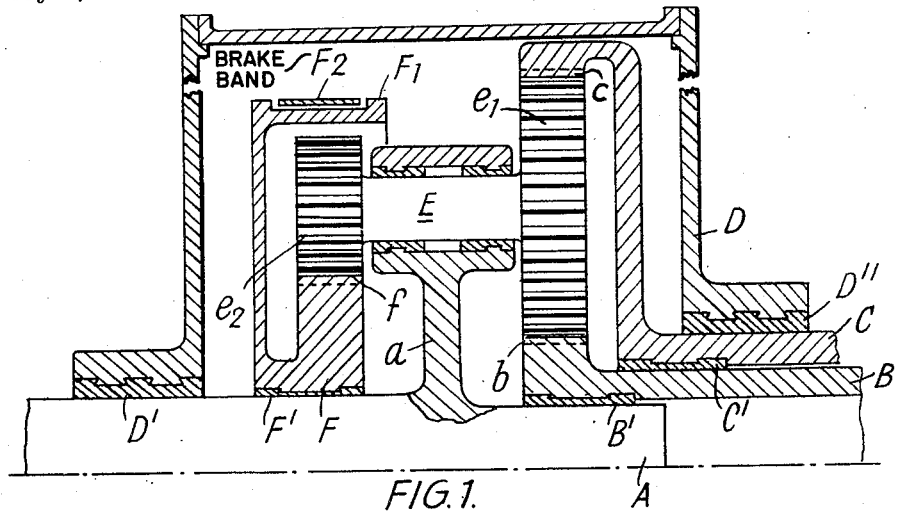

July 17, 1951  K. BAUMANN  2,561,090
POWER PLANT INCLUDING NORMALLY CONTRA-ROTATING TURBINE ELEMENTS
FOR DRIVING A LOAD SHAFT AND MEANS FOR ROTATING SAID ELEMENTS
IN THE SAME DIRECTION WHEN THE TURBINE IS IDLING
Filed May 1, 1944  4 Sheets-Sheet 1

INVENTOR
Karl Baumann
BY Loyd Hall Sutton
ATTORNEY

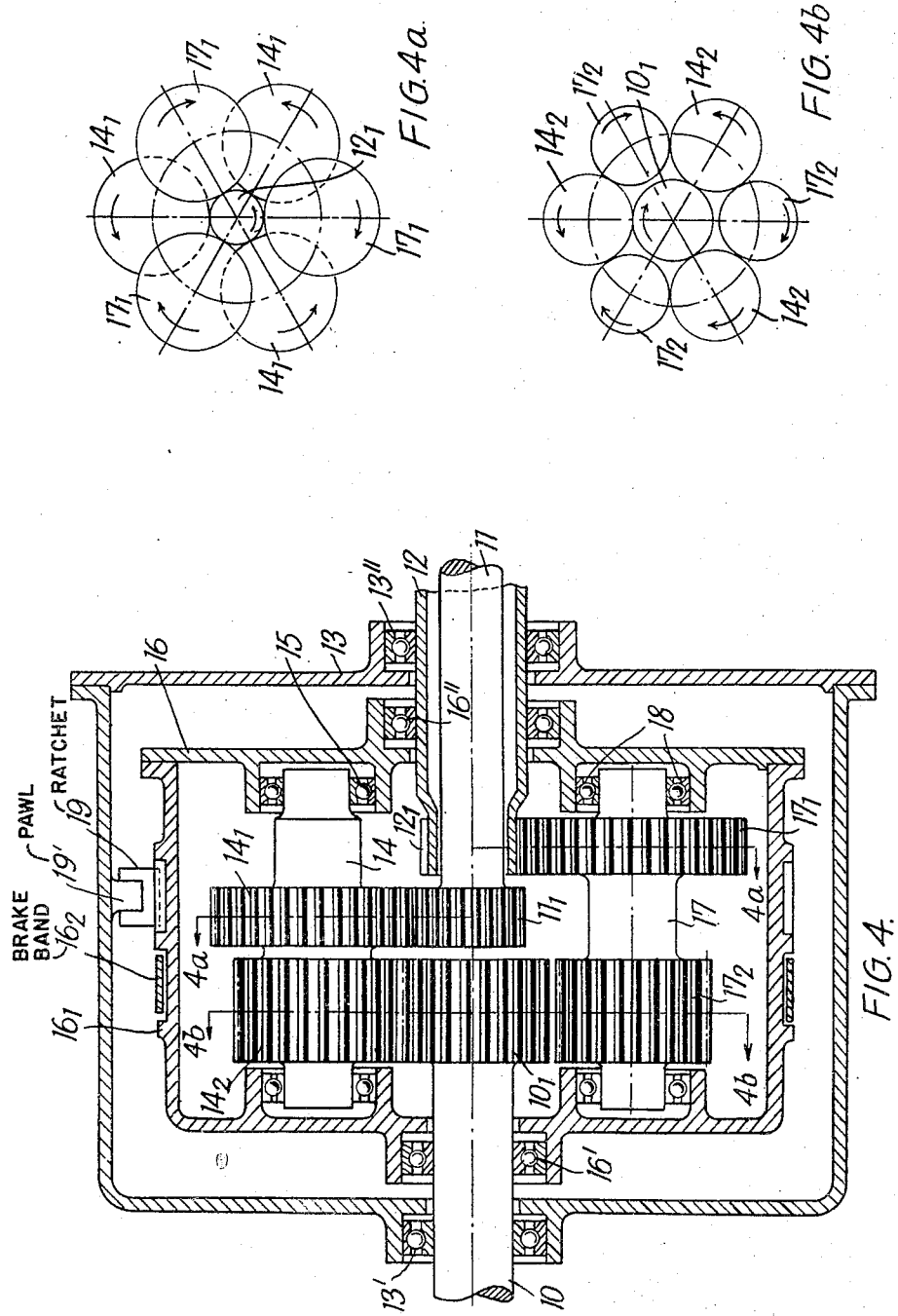

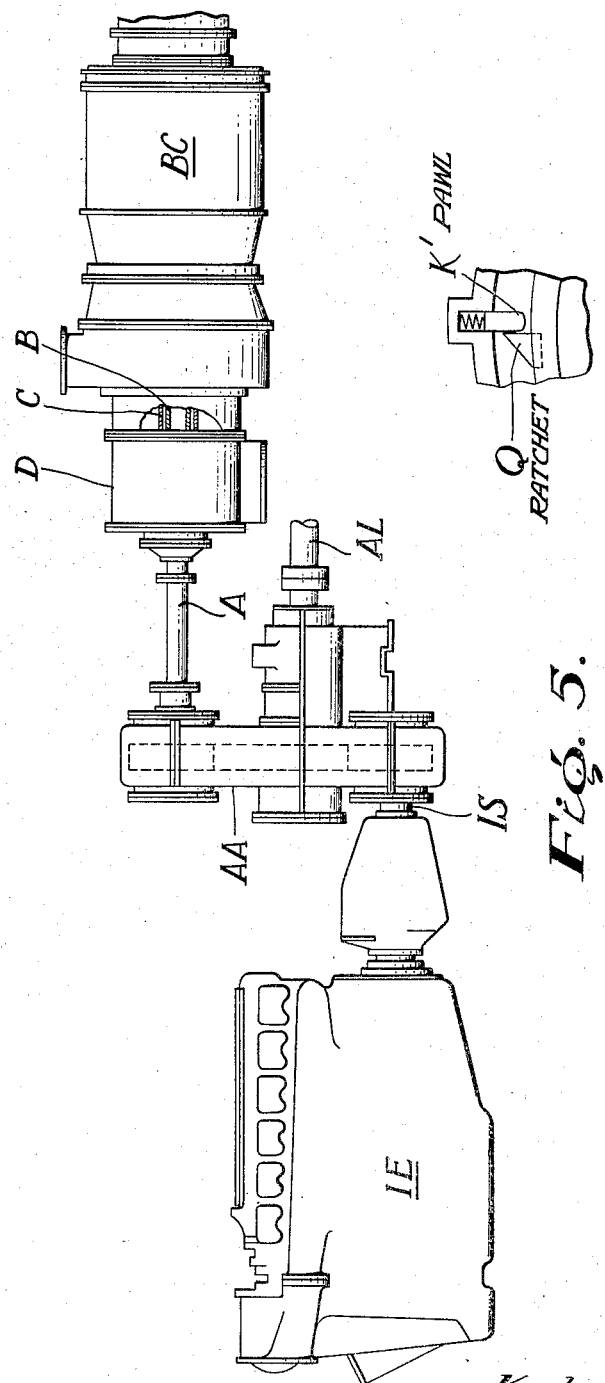

Patented July 17, 1951

2,561,090

UNITED STATES PATENT OFFICE 2,561,090

POWER PLANT, INCLUDING NORMALLY CONTRAROTATING TURBINE ELEMENTS FOR DRIVING A LOAD SHAFT AND MEANS FOR ROTATING SAID ELEMENTS IN THE SAME DIRECTION WHEN THE TURBINE IS IDLING

Karl Baumann, Mere, Knutsford, England, assignor to Metropolitan-Vickers Electrical Company Limited, London, England, a company of Great Britain Application May 1, 1944, Serial No. 533,630
In Great Britain November 18, 1942

Section 1, Public Law 690, August 8, 1946
Patent expires November 18, 1962

14 Claims. (Cl. 60—11)

This invention relates to a power plant in which, jointly with other sources of power, elastic fluid turbines are utilised to drive load shafts through transmission gearing which may, in some cases, give speed reduction. It will be understood that the load shaft may drive any desired final load device, or several final load devices, such for instance, in marine propulsion, as one or more propellers, either directly or through final gearing which, by itself, may give the required, or additional, speed reduction in the case of a single load device or, in the case of several final load devices, at least one of the latter can be coupled to the load shaft through final gearing.

For the propulsion of ships, vehicles and other craft in which, for instance, reciprocating engines provide the normal sources of power for, say, cruising and usually reversing, the adoption of elastic fluid turbines as auxiliary sources of power for increasing the available motive power as, and when, occasion demands is especially desirable owing to their inherent relative lightness. However, since the elastic fluid turbines when so used may not normally be in operation, for instance during cruising, special provision must be made for effecting connection or disconnection with the reciprocating engines or other sources of power and the same load shafts. Usually such connection is effected by friction clutches or hydraulic couplings, and in fact, with elastic fluid turbines of the more ordinary, that is single-rotation, type providing the supplementary sources of power, these particular couplings are generally essential since the ventilation losses are liable to be excessively high, owing to the pumping action arising from the relatively high speed of the moving blades in relation to the stationary blades or, in other words, due to the tendency for the turbine to act as a compressor. Since these couplings may have to transmit very appreciable power, the tendency is for them to become inconveniently bulky and heavy, a factor which is obviously undesirable in the case of ships, vehicles and other craft.

According to the present invention, the load shaft which is, or may be, driven from a main source of power is arranged to be coupled to an elastic fluid turbine of the so-called contrarotational type, namely having mutually-reacting rotary members, by means of a transmission gearing arranged to permit the mutually-reacting rotary members of the turbine to rotate in opposite directions to one another so as jointly to drive said load shaft, as required during normal operation of the turbine for supplying power, but also capable of being rendered effectual to permit said mutually-reacting rotary members to be rotated by said load shaft in the same direction as one another when said turbine is idling.

Since, in a turbine running idle, the pumping effect is proportional to the square of the relative speed of successive rows of blades, it is preferable to utilise transmission gearing such that, during idling of the turbine, the mutually-reacting rotary members rotate in one and the same direction at approximately the same speed (revolutions per minute), whereby the power absorbed in respect of pumping during idling conditions of the turbine is minimised.

In practising the invention, various arrangements of transmission gearing may be provided for achieving the purposes in view.

In one arrangement, the load shaft may be connected through transmission gearing of the planet type to the mutually-reacting turbine members, that is the actual rotors of the turbine, or shafts or members connected therewith.

In another arrangement according to the invention two bevel wheels of a differential bevel gear are rigidly connected respectively to the mutually-reacting rotary members of the turbine, whilst one of these rotary members forms part of, or is coupled directly or otherwise to, the load shaft, and the differential member or "cage" is adapted, at will, to be held against, or freed for, rotation.

In another arrangement according to the invention, the mutually-reacting rotary members of the turbine are coupled to the load shaft through spur gearing.

In a still further arrangement according to the invention the mutually-reacting rotary members of the turbine are coupled to the load shaft through spur gearing and an additional gear train affording speed reduction between the turbine rotors and the load shaft.

Figure 2:
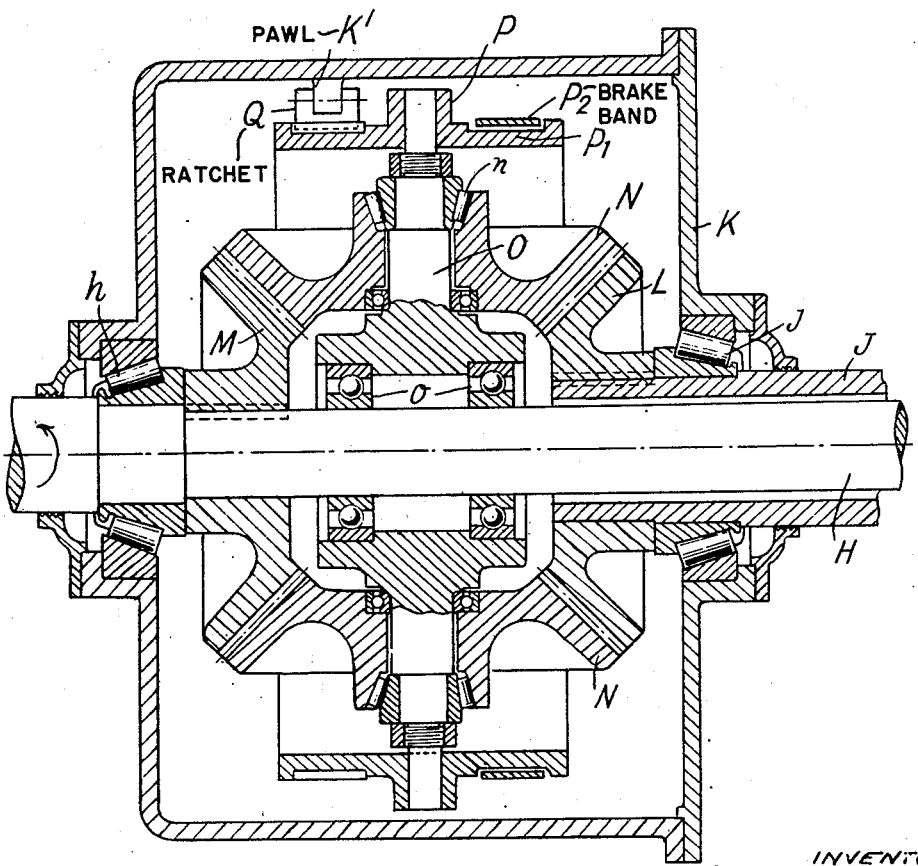
Figures 3A, 3B:
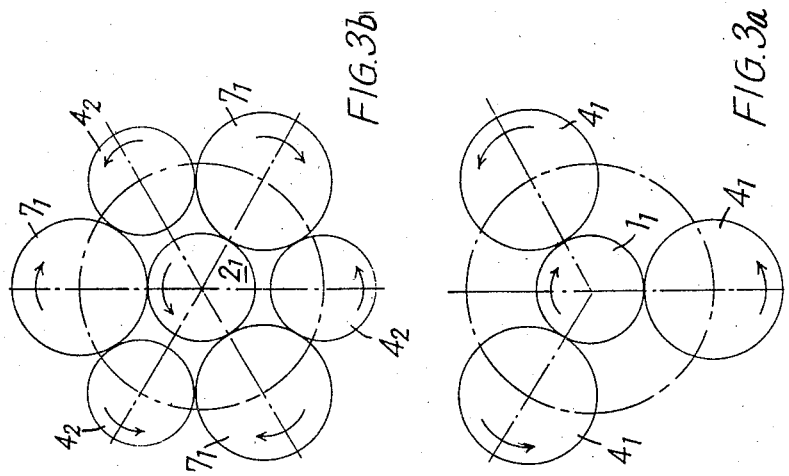
Figure 3:
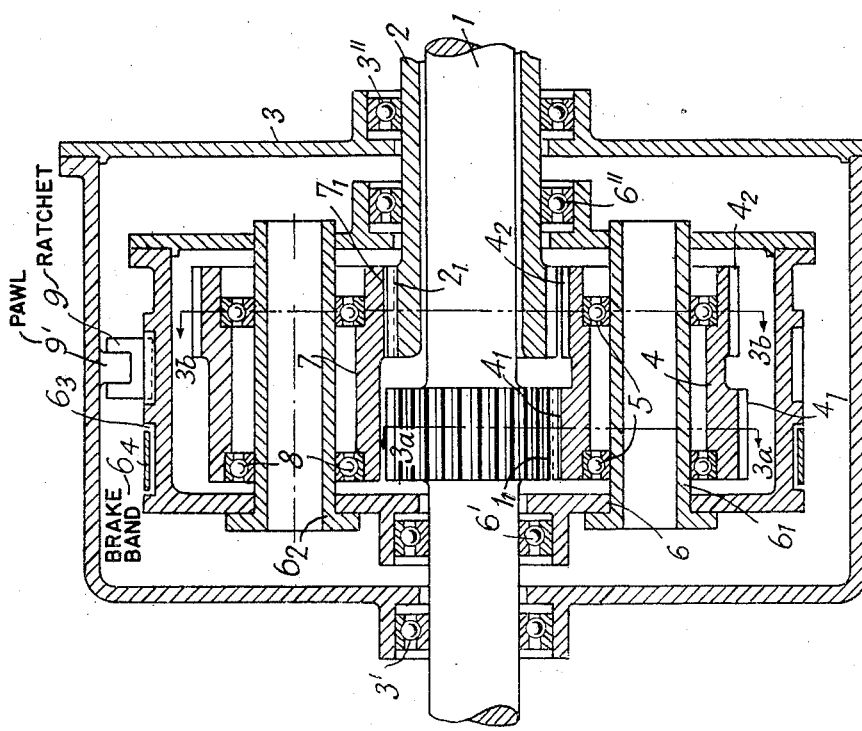

In order that the invention may be fully understood, reference will now be made, by way of example, to the accompanying diagrammatic drawings in which Figures 1, 2, 3 and 4 are representative of respective forms of gearing mechanism according to the invention, while Fig. 5 is a diagrammatic illustration of a power plant according to the invention including a contra-rotational turbine connected through gearing mechanism in any one of the forms illustrated in Figs. 1 to 4 inclusive, with a load shaft which is also connected through conventional gearing with an internal combustion engine. In the drawings:

Fig. 1 is a longitudinal half-sectional view of transmission gearing of the planet type connecting the contra-rotational turbine with the load shaft of the power plant of Fig. 5, Fig. 2 is a longitudinal sectional view of transmission gearing of the bevel-wheel differential type connecting the contra-rotational turbine with the load shaft of the power plant of Fig. 5, Fig. 2a being a fragmentary view, taken at right angles to that of Fig. 2, to show more clearly the catch for opposing rotation of planetary carrier of Fig. 2, Fig. 3 is a longitudinal sectional view of transmission gearing of the spur wheel type connecting the contra-rotational turbine with the load shaft of the power plant of Fig. 5, Figs. 3a and 3b are simplified transverse sectional views, to reduced scale, taken along the lines 3a—3a and 3b—3b respectively of Fig. 3, Fig. 4 is a longitudinal sectional view of another form of transmission gearing of the spur wheel type connecting the contra-rotational turbine with the load shaft of the power plant of Fig. 5, and Figs. 4a and 4b are simplified transverse sectional views, to reduced scale, taken along the lines 4a—4a and 4b—4b respectively of Fig. 4.

Referring first to Fig. 5, BC is a contra-rotational gas turbine which it is intended shall be used at times to assist an internal combustion engine IE to drive a final load shaft AL; the load shaft AL may, for example, be a propeller shaft on a ship or other craft. More specifically, the concentric shafts B and C, to which the contra-rotational rotors of the turbine will be respectively attached, are connected to an intermediate load shaft A through gearing mechanism which in this figure is represented by its casing D and which is presently to be described in detail. The intermediate load shaft A, which is essentially coaxial with the concentric shafts B and C, as indicated by the chain-dotted line representative of their common axis, is connected through a conventional gear box AA with the final load shaft AL. The gear box AA also connects the output shaft IS of internal combustion engine IE to the final load shaft AL. With the internal combustion engine IE operating normally to drive the final load shaft AL, the intermediate load shaft A will also be rotated owing to its coupling through the gear box AA. When the turbine BC is being supplied with fuel, the concentric shafts B and C will be rotated in opposite directions, and by virtue of the gearing included in the casing D as presently to be described, these shafts B and C are arranged jointly to augment the torque in the intermediate load shaft A; with the turbine idling, that is with its fuel supply cut off, the concentric shafts B and C are rotated in one and the same direction by the intermediate load shaft A through the aforesaid gear mechanism.

The gear mechanism coupling the concentric shafts B and C for the contra-rotational turbine BC with the intermediate load shaft A is shown to enlarged scale in Fig. 1.

Referring to Fig. 1, the concentric shafts B and C, adapted to be rotatable one each with the contra-rotational rotors of the turbine as aforesaid, are shown as separate from, albeit coaxial with, the engine-driven load shaft A. Said shafts B and C are shown respectively as an inner sleeve and an outer sleeve for the shaft A. As shown, the inner sleeve shaft B provides a bearing B' for the load shaft A while the outer sleeve C provides a bearing C' for the inner sleeve shaft B. Cylindrical casing D encloses planet gearing, presently to be described, for coupling the sleeve shafts B and C with the load shaft A, said casing D being stationary and providing mountings for bearings D', D'' for the load shaft A and outer sleeve shaft C respectively.

In the planet gear aforesaid, the load shaft A has attached to it a radial web $a$, but preferably a plurality of circularly distributed such webs terminating in a flange in which planet shaft E, but preferably a plurality of circularly distributed such planet shafts, is/are journalled so as to be freely rotatable about an axis, or axes, parallel with the axis of the load shaft A. At one end of the, or each, planet shaft E, the shaft has attached to it a gear wheel $e_1$ meshing with a gear wheel comprising external gear teeth $b$ on the sleeve B and also meshing at a greater radius with a gear wheel comprising gear teeth $c$ carried internally by a cylindrical extension of the sleeve C. At the other end of the, or each, planet shaft E, said shaft has fast with it a smaller gear wheel $e_2$ meshing with a gear wheel comprising gear teeth $f$ attached to a sleeve F which is loosely carried by the load shaft A through bearing F''. The sleeve F has an integral or attached cylindrical flange $F_1$ providing a surface for engagement by a band or equivalent braking member $F_2$.

In operation, the brake members $F_1$ and $F_2$ will normally be engaged accordingly to restrain the sleeve F against rotation relatively to the casing D, and in these circumstances, the turbine shafts B and C, rotating in opposite directions as they will do when the turbine is operating normally, will jointly assist in driving the load shaft A, that is they will jointly contribute torque supplementing the torque provided by the internal combustion engine IE of Fig. 5. With the brake members $F_1$ and $F_2$ disengaged, as will be the case when it is desired that the turbine should be idling, the rotation of the load shaft A by the engine of Fig. 5 will act through the gearing to produce rotation of the turbine shafts B and C in the same direction as one another and at substantially the same speeds (R. P. M.) By selection of the diameter of the gear wheel comprising teeth $f$ and sleeve F, the ratios between the speeds of the contra-rotational turbine connected shafts B and C and the load shaft A during normal operation of the turbine in the power plant of Fig. 5 may be adjusted according to requirements.

Referring to Fig. 2, which shows a form of gearing differing in detailed construction from, but equivalent in operation to, that of Fig. 1, shaft H is the load shaft replacing the load shaft A and the turbine-operated shaft B of Figs. 1 and 5, while shaft J replaces the turbine-operated shaft C of Figs. 1 and 5; that is to say the load shaft H which will be rotated by the engine IE of Fig. 5 is rotatable with one of the contra-rotatable rotors of the turbine BC (Fig. 5) while shaft J is rotatable with the other of the contra-rotatable rotors of turbine BC (Fig. 5). As shown the shaft J is in the form of a sleeve shaft concentric with the shaft H. A fixed cylindrical casing K enclosing a bevel-wheel differential gear, presently to be described, for coupling the shafts H and J, carries roller bearings $h$ and $j$ respectively for the shafts H and J; the casing K replaces the casing D of Figs. 1 and 5.

Within the casing K there is keyed to the shaft J a bevel gear wheel L and keyed to the shaft H is a bevel gear wheel M. Meshing with bevel-wheels L and M are bevel-wheels N journalled in roller bearings $n$ on respective radial arms of a spider O, which in turn, is mounted through ball-bearings $o$ on the shaft H. The spider arms O are attached at their outer ends to a cylindrical flange P having a recessed cylindrical surface $P_1$ which can be engaged by a band $P_2$ for braking rotation of the differential member formed by said spider O, flange P and the bevel wheels N. In addition the casing K carries internally a spring-loaded pawl K' for engaging with a ratchet Q fast with the flange P thus to constitute a catch preventing rotation of the said differential member in one direction while permitting its rotation in the other direction.

In operation and assuming that the load shaft H is rotating in the direction of the arrow, and also that the turbine is on load so that the shaft J is rotated oppositely to shaft H, since the differential member aforesaid is prevented, by engagement of the ratchet Q with the pawl K', from rotating in the opposite direction to that of the shaft H, the bevel wheels N, in rotating about the arms O, act to augment the driving torque on the shaft H, that is for supplementing the drive applied to said shaft by the engine IE (Fig. 5). However, with the fuel cut off from the turbine, the shaft H, being still rotated by the engine IE (Fig. 5) will act through the bevel wheels N to rotate the differential member aforesaid in the same direction, namely as permitted by the spring-loaded pawl K' in riding over the teeth of the ratchet Q, the bevel wheel L, and thus the shaft J, being accordingly rotated in the same direction as the shaft H; by appropriate selection of the gear ratios, namely with the bevel-wheel L of diameter different from that of bevel-wheel M, and the inclination of the axes of bevel-wheels N correspondingly adjusted, the shafts J and H may rotate at different speeds during normal operation of the turbine as may be desired, although during the idling operation the speed of the shaft H will be lower than that of shaft J, this being desirable with a view to minimizing friction losses. It will be appreciated that the brake $P_1$, $P_2$ will be actuated to slow up the differential member aforesaid when it is desired to change over from the condition in which the turbine is idling to that for normal operation of the turbine, the one-way catch Q, K' being effective to prevent rotation of said differential member in the opposite direction to that of shaft H after the shaft J has been brought substantially to rest.

Referring now to Fig. 3, at 1 is indicated a shaft which will be attached to, or form part of, one of the mutually-reacting turbine members, the co-axial surrounding sleeve shaft 2 being attached to, or forming part of, the other of said mutually-reacting turbine members; the shaft 1 moreover constitutes an engine-driven rotatable shaft. The shafts 1 and 2 are surrounded by stationary cylindrical casing 3 in which are mounted ball-bearings 3' for the shaft 1 and ball-bearings 3'' for the shaft 2. It will be appreciated that, when the gearing of Fig. 3 is employed in the power plant of Fig. 5, the shaft 1 replaces the shafts A and B of Fig. 5, shaft 2 replaces shaft C of Fig. 5 and casing 3 replaces casing D of Fig. 5.

Within the casing 3 is spur gearing for coupling the shafts 1 and 2, in which a gear wheel $1_1$ fast with the shaft 1 is in mesh with three gear wheels $4_1$ fast on respective sleeves 4 which are respectively mounted, through ball-bearings 5, on tubular frame members $6_1$ forming part of a frame or cage 6, which, in turn, is carried through ball-bearings 6' on the shaft 1 and through ball-bearings 6'' on the shaft 2, said frame members $6_1$ being distributed circularly around the shaft 1 so that the gear wheels $4_1$ are spaced at equal intervals around, and are rotatable about axes parallel with, the axis of shaft 1, as represented in Fig. 3a. Fast with the shaft 2 is gear wheel $2_1$ meshing with three gear wheels $7_1$ fast to respective sleeve members 7 which are respectively mounted, through ball-bearings 8, on frame members $6_2$ forming part of the said frame or cage 6, said frame members $6_2$ being circularly distributed around the shaft 1 so that gear wheels $7_1$ are spaced at equal intervals around and are rotatable about axes parallel with, the axis of shaft 1 and, furthermore, which axes are disposed intermediately of the axes of the gear wheels $4_1$; as represented in Fig. 3a, said gear wheels $7_1$, in addition to being in mesh with gear wheels $2_1$ are also in mesh with gear wheels $4_2$ which together with gear wheels $4_1$ are fast with the aforesaid sleeves 4. The peripheral surface $6_3$ of the cage 6 is engageable by a band $6_4$ for restraining said cage, and thus the gears carried thereby, against rotation relative to casing 3. In addition, ratchet 9 fast with the cage 6 is engaged by spring-loaded pawl 9' carried by casing 3 (corresponding to ratchet Q and spring-loaded pawl K' of Fig. 2) whereby to prevent rotation of the cage 6 in the opposite direction to that in which shaft 1 is rotated though permitting said cage to rotate in the same direction as shaft 1.

In operation, with the shafts 1 and 2 rotating in opposite directions as will be the case during normal operation of the turbine, and the catch 9, 9' effective to lock the cage 6 against rotation in opposite direction to that of shaft 1, and assuming the brake $6_3$, $6_4$ is released, the shaft 2, acting through the gearing which in these circumstances is effective positively to couple shaft 1 with shaft 2, will augment the torque applied to shaft 1, thus to assist the engine IE (Fig. 5) in driving the load shaft AL (Fig. 5). However, during idling of the turbine, that is with working fluid cut off, since the catch 9, 9' permits rotation of the cage 6 in the same direction as that in which the shaft 1 is rotating, the shaft 2 is freed from positive coupling with shaft 1, and accordingly, while the turbine rotor connected to shaft 1 is positively rotated thereby, the turbine rotor connected to shaft 2 is caused, by windage, to rotate in the same direction, and at substantially the same speed, as the rotor connected with shaft 1; by appropriate selection of the gear ratios, the shafts 1 and 2 may rotate at any desired speeds during normal turbine operation, although it is preferred that, during such normal operation, shaft 1 will rotate at a speed lower than that of shaft 2, with a view to minimising friction losses when the turbine is idling. It will be appreciated that brake $6_3$, $6_4$ will be utilised for restraining rotation of the cage 6 while the turbine rotor connected to shaft 2 is being brought to rest prior to being rotated in opposite direction to that of shaft 1, that is during the change-over from the idling condition of the turbine to the load condition.

Referring now to Fig. 4, at 10 is indicated the load shaft rotated by the internal combustion engine IE of Fig. 5. At 11 and 12 respectively are indicated an inner shaft and an outer sleeve shaft which are coaxial with the load shaft 10 and which will be respectively connected to, or form part of, the mutually-reacting members of the turbine BC of Fig. 5. The shafts are surrounded by a fixed cylindrical casing 13 in which are mounted ball-bearings 13' for the load shaft 10 and ball-bearings 13" for the sleeve shaft 12, said casing 13 corresponding to the casing D of Fig. 5.

Within the casing 13 the shaft 11 has fast with it a gear wheel $11_1$ meshing with three gear wheels $14_1$ fast with respective layshafts 14 mounted through ball-bearings 15 in a cage 16 which, in turn, is mounted through ball-bearings 16' and 16" on the load shaft 10 and shaft 12 respectively, the layshafts 14 being circularly distributed around the shaft 11 so that the gear wheels $14_1$ are equi-spaced therearound as represented in Fig. 4a. The layshafts 14 also have fast therewith respective gear wheels $14_2$ axially displaced from the gear wheels $14_1$ and meshing with a gear wheel $10_1$ fast with the load shaft 10. The sleeve shaft 12 has fast to it a gear wheel $12_1$ meshing with three gear wheels $17_1$ fast upon respective layshafts 17 mounted through ball-bearings 18 on the cage 16, said layshafts 17 being circularly distributed with equal spacing around the shaft 11 so that the gear wheels $17_1$ are rotatable about axes parallel with the axis of the shaft 11 and disposed intermediately of the axes about which are rotatable the gear wheels $14_1$, as represented in Fig. 4a. Fast upon the layshafts 17 are gear wheels $17_2$ axially displaced from the gear wheels $17_1$ and meshing with the gear wheels $14_2$ which, as aforesaid, are in mesh with gear wheel $10_1$, as represented in Fig. 4b. A peripheral surface $16_1$ of the cage 16 is engageable by a band $16_2$ for braking said cage, and in addition there is provided the one-way catch constituted by ratchet 19 fast with the cage 16 and co-operating spring-loaded pawl 19' carried by casing 13 (all as previously described with reference to Fig. 2) namely for locking the cage against rotation in the opposite direction to that in which the shaft 10 is rotating.

In operation, with the shafts 11 and 12 rotating in opposite directions, as will be the case during normal operation of the turbine, and with the catch 19, 19' effective to restrain the cage 16 against rotation oppositely to shaft 10, the shafts 11 and 12 act through the gearing to apply assisting torques to the load shaft 10, this being the condition desired in the power plant of Fig. 5 when using the turbine to assist the engine in driving the load shaft. However, with the brake $16_1$, $16_2$ released and the catch 19, 19' permitting rotation of the cage 16, in the same direction as the shaft 10 is rotating, the latter, due to its rotation by the engine (Fig. 5), will act through the gearing to ensure rotation of the shafts 11 and 12 in one and the same direction. In some cases the gear ratios will be selected so as to allow of the shafts 11 and 12 rotating in opposite directions at desired different speeds during normal operation of the turbine and likewise at somewhat different speeds, though in the same direction, during idling operation of the turbine. The brake $16_1$, $16_2$ will be used more particularly in bringing the cage 16 to rest for initiating change from idling of the turbine to normal operation thereof. With this form of gearing, greater speed reduction may be obtained between the contra-rotational rotors and the load shaft than is obtainable with the form of gearing of Fig. 3.

With a view to minimising friction losses in the bearings of the transmission gear, it is preferable that some or all of the bearings in the arrangements of transmission gear above described be of the ball- or roller-bearing type.

It will readily be appreciated that, with the arrangements of transmission gear according to the present invention previously described, the necessity for coupling the turbine with the load shaft by means of hydraulic and/or friction clutches required to transmit all or most of the power developed by the turbine is avoided and the gear can be relatively light and compact, a feature which is obviously of great importance where the power plant is intended for use on ships, vehicles and other mobile craft.

When applied to the propulsion of ships, vehicles and other craft, it is contemplated that the contra-rotational turbine will be rendered inoperative for instance by the cutting-off of motive fluid whilst the craft is acting under cruising or reversing conditions and that the gear will be conditioned to augment the power driving the load shaft as, and when, conditions require, that is when the load increases or is liable so to do.

Any suitable form of control means for the band-brake friction device or other means for conditioning the transmission gear under idling conditions of the turbine and for rendering the gear effectual to enable the turbine to drive the load shaft, may be provided.

It will be understood that the elastic fluid turbine may be of the internal combustion type or otherwise.

While the invention is eminently suitable for use in the propulsion of ships, or other craft, and particularly small high speed craft, it will be appreciated that the invention is not limited in this respect. Moreover, while in general it is contemplated to utilise turbines in conjunction with reciprocating engines for the propulsion of ships, vehicles and other mobile craft, the invention is not to be considered as limited in this respect.

I claim:

1. A power plant comprising the combination of an engine, a load shaft driven by said engine, an elastic fluid turbine for supplying additional torque at will to said load shaft, said turbine having two normally mutually-reacting contra-rotating bladed driving elements, a gear train coupling said driving elements together and at least one of said driving elements to said load shaft, said gear train including two coaxial gears connected respectively with said driving elements and gearing interconnecting said coaxial gears, said gearing comprising an element rotatable about the common axis of said coaxial gears when said turbine is running idle with said bladed driving elements rotating in the same direction, and means for preventing rotation of said element about said common axis when said bladed driving elements are rotated in opposite directions whereby said turbine may supply additional torque to said load shaft.

2. A power plant comprising in combination an engine, a load shaft driven by said engine, an elastic fluid turbine for supplying additional torque to said load shaft, said turbine having two normally mutually - reacting contra - rotating bladed driving elements, a pair of concentric shafts arranged coaxially with said load shaft and coupled respectively with said driving elements, and gearing interconnecting said concentric shafts and said load shaft, said gearing including a gear member coaxial with and rotatable by said load shaft when said turbine is idling, said gearing transmitting torque from said load shaft to rotate said concentric shafts and said bladed driving elements in one and the same direction when said gear member is rotated by said load shaft, and means for preventing rotation of said gear member by said load shaft when operating fluid is supplied to said turbine so as to transmit torque from the contra-rotating bladed driving elements and concentric shafts to said load shaft.

3. A power plant comprising in combination an engine, a load shaft driven by said engine, an elastic fluid turbine for supplying additional torque to said load shaft, said turbine having two normally mutually - reacting contra - rotating bladed driving elements, a pair of concentric shafts arranged coaxially with said load shaft and coupled respectively with said driving elements, and adjustable gearing so constructed and arranged as to connect said concentric shafts for rotation in opposite directions in driving relation with said load shaft when operating fluid is supplied to said turbine, and to connect said concentric shafts in driven relation with said load shaft for rotation in one and the same direction when the supply of operating fluid to said turbine is discontinued, said gearing including an element rotatable about the axis of said load shaft when the turbine is idling, and brake means for preventing rotation of said element when operating fluid is supplied to said turbine whereby the direction of torque transmission through said gearing is reversed.

4. A power plant comprising in combination an engine, a load shaft driven by said engine, an elastic fluid turbine for supplying additional torque to said load shaft, said turbine having two normally mutually - reacting contra - rotating bladed driving elements one of which is coupled with said load shaft, a shaft concentric with said load shaft with which the other bladed driving element is coupled, a gear train interconnecting said two shafts so constructed and arranged as to transmit torque to said load shaft from said bladed driving elements rotating in opposite directions when operating fluid is supplied to said turbine, and means for so restraining movement of a portion of said gear train as to transmit torque from said load shaft to rotate said bladed driving elements in one and the same direction when the supply of operating fluid to said turbine is discontinued.

5. A power plant comprising in combination an engine, a load shaft driven by said engine, an elastic fluid turbine for supplying additional torque to said load shaft, said turbine having two normally mutually-reacting contra-rotating bladed driving elements, a pair of concentric shafts arranged coaxially with said load shaft and coupled respectively with said driving elements, gearing for coupling said concentric shafts together and at least one of said shafts with the load shaft including a first gear wheel fast with one concentric shaft, a second gear wheel fast with the other concentric shaft, gear elements interconnecting said first and second gear wheels and an annular gear carrying member coaxial with said load shaft and arranged for rotation by said interconnecting gear elements about the axis of said load shaft when the turbine is idling and said concentric shafts are rotating in one and the same direction, and means for locking said member against rotation about the axis of said load shaft to cause said concentric shafts to rotate in opposite directions when operating fluid is supplied to said turbine and it is desired that the contra-rotating bladed driving elements thereof jointly augment the torque applied to the load shaft by the engine.

6. A power plant comprising in combination an engine, a load shaft driven by said engine, an elastic fluid turbine for supplying additional torque to said load shaft, said turbine having two normally mutually-reacting contra-rotating bladed driving elements one of which is coupled with said load shaft, a shaft concentric with said load shaft with which the other bladed driving element is coupled, gearing for coupling said load shaft with said concentric shaft including a first gear element fast on said load shaft, a second gear element fast on said concentric shaft, a planetary cage and planet wheels carried by said cage in mesh with said first and second gear elements, said planetary cage being rotatable about the axis of said load shaft when the turbine is idling and said concentric shaft is rotating in the same direction as said load shaft, and brake means for preventing rotation of said planetary cage to cause rotation of said concentric shaft in the opposite direction to said load shaft when operating fluid is supplied to said turbine and it is desired that the contra-rotating bladed driving elements thereof jointly augment the torque applied to the load shaft by the engine.

7. A power plant comprising in combination an engine, a load shaft driven by said engine, an elastic fluid turbine for supplying additional torque to said load shaft, said turbine having two normally mutually-reacting contra-rotating bladed driving elements, a pair of concentric shafts arranged coaxially with said load shaft and coupled respectively with said driving elements, gearing for coupling said concentric shafts together and at least one of said shafts with said load shaft including a first gear wheel fast with one concentric shaft, a second gear wheel fast with the other concentric shaft, a third gear wheel fast with said load shaft, a planetary cage mounted for rotation about the axis of said load shaft and planet wheels supported by said cage in mesh with said first, second and third gear wheels, and brake means for locking said planetary cage against rotation when operating fluid is supplied to the turbine whereby the contra-rotating bladed driving elements jointly augment the torque applied to the load shaft by the engine, rotation of said planetary cage when the turbine is idling so changing the operation of said gearing that said elements are then rotated in the same direction as one another by the load shaft.

8. A power plant comprising the combination of an engine, a load shaft driven by said engine, an elastic fluid turbine for supplying additional torque to said load shaft, said turbine having two normally mutually-reacting contra-rotating bladed driving elements, a pair of contra-rotatable concentric shafts coaxial with said load shaft and coupled respectively with said driving elements, gearing mechanism for interconnecting said concentric shafts with said load shaft including a first gear wheel rotatable with one concentric shaft, a second gear wheel rotatable with the other concentric shaft, a radial arm fast with the load shaft, a first planet wheel journaled in said radial arm and meshing with said first and second gear wheels, a second planet wheel rotatable with said first planet wheel and a third gear wheel rotatably mounted on the load shaft and in mesh with said second planet wheel, and means associated with said third gear wheel operable at will for opposing rotation thereof when operating fluid is supplied to the turbine whereby the contra-rotating bladed driving elements jointly augment the torque applied to the load shaft by the engine, rotation of said third gear wheel when the turbine is idling so changing the operation of said gearing mechanism that said elements are then rotated in the same direction as one another by the load shaft.

9. In a power plant, the combination of a driven shaft, an engine for driving said driven shaft, an elastic fluid turbine for supplying additional torque to said driven shaft, a concentric sleeve shaft surrounding said driven shaft and drivable by said turbine, gearing mechanism for interconnecting said driven shaft with said concentric sleeve shaft including a first bevel wheel fast with one of said shafts, a second bevel wheel fast with the other of said shafts, a circumferential member rotatably mounted on the driven shaft and a third bevel wheel journaled in said circumferential member for rotation about an axis perpendicular to the axis of said driven shaft and in mesh with both of said first and second bevel wheels, and means operable at will for holding said circumferential member against rotation when operating fluid is supplied to the turbine whereby the latter augments the torque applied to the load shaft by the engine, rotation of said circumferential member when the supply of operating fluid to the turbine is discontinued so changing the operation of said gearing mechanism that said concentric sleeve shaft and turbine are then driven by the load shaft.

10. In a power plant including a load shaft, an engine for driving said load shaft and a contra-rotational turbine having two normally mutually-reacting contra-rotating rotors coaxial with the load shaft, the combination of epicyclic gearing interconnecting the contra-rotatable rotors with the engine-driven load shaft to assist in driving same at reduced speed and including a planetary spider fast with the load shaft, a spindle journalled in said spider for rotation about an axis parallel to that of the load shaft, a larger planet gear wheel and a smaller planet gear wheel both fast with said spindle, an internally-toothed gear wheel adapted for rotation with one of the contra-rotatable rotors and an externally-toothed gear wheel adapted for rotation with the other of the contra-rotatable rotors, both of said internally- and externally-toothed gear wheels being in mesh with the larger planet gear wheel, a gear wheel rotatably mounted upon the load shaft and in mesh with the smaller planet gear wheel, and a friction brake associated with the gear wheel meshing with said smaller planet gear wheel and operable at will for holding said gear wheel against rotation when it is desired that the contra-rotating turbine rotors jointly augment the torque applied to the shaft by the engine, release of said brake so changing the operation of the epicyclic gearing that said rotors may be rotated in the same direction by the load shaft when the turbine is idling.

11. In a power plant including a load shaft, an engine for driving said load shaft, a sleeve shaft concentric with said load shaft and a contra-rotational turbine having one of its two normally mutually-reacting contra-rotating rotors fast with said load shaft and the other rotor fast with the sleeve shaft concentric with said load shaft, the combination of epicyclic gearing including a first bevel gear wheel fast with the load shaft and one of the contra-rotatable rotors, a second bevel gear wheel fast with the sleeve shaft and the other of the contra-rotatable rotors, a planetary carrier rotatably mounted upon the load shaft, a third bevel gear wheel journalled in said planetary carrier for rotation about an axis perpendicular to the axis of the load shaft and in mesh with said first and second bevel gear wheels, and means for holding said planetary carrier against rotation in the direction opposite to the direction of rotation of the load shaft whereby the turbine rotors when rotating oppositely to one another jointly augment the torque applied to the load shaft by the engine, rotation of said planetary carrier by and in the same direction as the load shaft when the turbine is idling so changing the operation of the epicyclic gearing that said rotors are then rotated in the same direction as one another by the load shaft.

12. A power plant as claimed in claim 11, having a friction brake associated with the planetary carrier and operable at will to oppose rotation of said carrier in either direction about the axis of said load shaft when it is desired to change over from turbine idling to turbine driving operation.

13. In a power plant including a load shaft, an engine for driving said shaft and a contra-rotational turbine having its two normally mutually-reacting contra-rotating rotors coaxial with the load shaft, the combination of epicyclic gearing including a first gear wheel fast with the load shaft, a second gear wheel fast with one of the contra-rotatable rotors, a third gear wheel fast with the other of the contra-rotatable rotors, a planetary carrier rotatably mounted at least upon the load shaft, a first set of layshafts journalled in said planetary carrier for rotation about axes parallel with the axis of the load shaft and circularly distributed with equal spacing around the axis of the load shaft, a first set of layshaft gear wheels fast with respective layshafts of the first set and meshing with said second gear wheel, a second set of layshaft gear wheels fast with respective layshafts of said first set and in mesh with said first gear wheel, a second set of layshafts journalled in the carrier for rotation about axes parallel with the axis of the load shaft and circularly distributed around the axis of the load shaft and intermediately of the axes of the first set of layshafts, a third set of layshafts gear wheels fast with respective layshafts of said second set thereof and in mesh with said third gear wheel, and a fourth set of layshaft gear wheels fast with respective layshaft gear wheels of said third set thereof and in mesh with the layshaft gear wheels of said second set thereof, means associated with said carrier for holding same against rotation in the direction opposite to that of said load shaft whereby the turbine rotors when rotating oppositely to one another jointly augment the torque applied to the load shaft by the engine, rotation of said carrier in the same direction as the load shaft when the turbine is idling so changing the operation of the epicyclic gearing that said rotors are then rotated in the same direction as one another by the load shaft, and means associated with said carrier and operable at will for opposing rotation of said carrier in either direction relatively to the load shaft when it is desired to change over from turbine idling to turbine driving operation.

14. In a power plant including a load shaft, an engine for driving said load shaft, a sleeve shaft concentric with said load shaft and a contra-rotational turbine having one of its two normally mutually-reacting contra-rotating rotors rotatable with said load shaft and the other rotor rotatable with the sleeve shaft concentric with said load shaft, the combination of epicyclic gearing including a first gear wheel fast with the load shaft and one of the contra-rotatable rotors, a second gear wheel fast with the sleeve shaft and the other of the contra-rotatable rotors, a planetary carrier rotatably mounted at least upon the load shaft, a first set of layshaft gear wheels journalled in said carrier for rotation about respective axes parallel with that of the load shaft and circularly distributed, with equal spacing, around said axis, with said layshaft gear wheels meshing with said first gear wheel, a second set of layshaft gear wheels individually fast with respective layshaft gear wheels of the first set, a third set of layshaft gear wheels journalled in said carrier for rotation about axes parallel with that of the load shaft and circularly distributed around the axis of said load shaft, with the layshaft gear wheels of said third set meshing with the layshaft gear wheels of the second set and also with said second gear wheel, and means for holding said planetary carrier against rotation at least in the direction opposite to that of the load shaft whereby the turbine rotors when rotating oppositely to one another jointly augment the torque applied to the load shaft by the engine, rotation of said planetary carrier in the same direction as the load shaft when the turbine is idling so changing the operation of the epicyclic gearing that said rotors are then rotated in the same direction as one another by the load shaft.

KARL BAUMANN.

REFERENCES CITED

The following references are of record in the file of this patent:

UNITED STATES PATENTS

| Number | Name | Date |
|---|---|---|
| 1,108,422 | Barnum | Aug. 25, 1914 |
| 1,313,058 | Bonom | Aug. 12, 1919 |
| 1,475,271 | Ahlbrecht | Nov. 27, 1923 |
| 1,604,730 | Weyer | Oct. 26, 1926 |
| 1,684,162 | Trumpler | Sept. 11, 1928 |
| 1,696,836 | Bushyager | Dec. 25, 1928 |
| 1,845,955 | Bonom | Feb. 16, 1932 |
| 2,149,785 | Neugebauer | Mar. 7, 1939 |
| 2,309,559 | Wemp | Jan. 26, 1943 |
| 2,318,990 | Doran | May 11, 1943 |

FOREIGN PATENTS

| Number | Country | Date |
|---|---|---|
| 753,517 | France | Aug. 12, 1933 |